United States Patent [19]
Nishimura et al.

[11] Patent Number: 5,086,745
[45] Date of Patent: Feb. 11, 1992

[54] METHOD AND APPARATUS FOR PROCESSING A THERMAL FLOWRATE SENSOR SIGNAL

[75] Inventors: Yukinobu Nishimura; Setsuhiro Shimomura; Nobutake Taniguchi; Kouji Tanimoto, all of Hyogo, Japan

[73] Assignee: Mitsubishi Denki Kabushiki Kaisha, Tokyo, Japan

[21] Appl. No.: 550,765

[22] Filed: Jul. 10, 1990

[30] Foreign Application Priority Data

Jul. 11, 1989 [JP] Japan .................. 1-178427

[51] Int. Cl.⁵ .......................... F02M 51/00
[52] U.S. Cl. ................. 123/494; 364/431.05; 73/118.2
[58] Field of Search ............ 123/494, 492, 493; 364/431.05, 510; 73/118.2, 116, 204.27, 204.14, 204.16

[56] References Cited

U.S. PATENT DOCUMENTS

| | | | |
|---|---|---|---|
| 4,612,894 | 9/1986 | Satoh et al. | 23/116 |
| 4,638,858 | 8/1987 | Sato et al. | 123/494 |
| 4,730,255 | 3/1988 | Akiyama et al. | 364/431.05 |
| 4,759,213 | 7/1988 | Porth et al. | 73/118.2 |
| 4,796,588 | 1/1989 | Shimoumura et al. | 123/494 |
| 4,796,591 | 1/1989 | Kiyono et al. | 123/494 |
| 4,807,151 | 2/1989 | Citron | 364/510 |
| 4,821,700 | 4/1989 | Weibler et al. | 73/118.2 |
| 4,889,101 | 12/1989 | Schifferl | 123/494 |

FOREIGN PATENT DOCUMENTS 134919 6/1988 Japan .................. 123/494

OTHER PUBLICATIONS

U.S. Application Ser. No. 07/479,821, filed Feb. 13, 1990, Nishimura et al.

Primary Examiner—Raymond A. Neill
Attorney, Agent, or Firm—Sughrue, Mion, Zinn, Macpeak and Seas

[57] ABSTRACT

A method of processing a signal of a thermal flow-rate sensor, provides a temperature monitor for monitoring a temperature at a representative point on a substrate support member; obtains the temperature at the representative point corresponding to the flow rate by use of the temperature monitor; and corrects an output of the sensor in accordance with a value corresponding to the temperature as well as a value corresponding to the temperature at the representative point when the flow rate is in a steady state.

6 Claims, 6 Drawing Sheets

METHOD AND APPARATUS FOR PROCESSING A THERMAL FLOWRATE SENSOR SIGNAL

BACKGROUND OF THE INVENTION

The present invention is directed to a thermal flow-rate sensor for detecting a flow rate of a fluid, and in particular, to a signal processing method and apparatus intended to improve response to variations in a flow rate.

A well-known thermal flow-rate sensor of the prior art is a thermal air flow-rate sensor for detecting an air intake flow rate of an internal combustion engine. Such a sensor typically comprises a known hot wire type air flow-rate sensor adapted to obtain an air flow-rate signal corresponding to a current value by controlling an electric current supplied to a platinum wire to maintain the temperature of the platinum wire placed inwardly in an intake passageway constant. A thermal air flow-rate sensor in which platinum, instead of a platinum wire, is deposited on an aluminum substrate or a film has recently attracted much attention as an inexpensive version of the hot wire type air flow-rate sensor.

The thermal air flow-rate sensor is arranged to measure an air flow rate by detecting the electric current supplied to a temperature-dependent resistor controlled at a constant temperature. However, this arrangement gives rise to errors in detecting characteristics due to a lag in the output response when the air flow rate to be measured varies because of the temperature-dependent resistor, and heat accumulation and thermal conduction in a support member thereof. In the case of the hot wire type air flow-rate sensor wherein, e.g., a platinum wire is stretched inside the intake passageway, the influence of such a support member is relatively small. In the case of a hot wire type air flow-rate sensor including a platinum wire wound on a ceramic bobbin, or a thermal air flow-rate sensor wherein platinum is deposited on an aluminum substrate or on a film, however, the heat accumulation and thermal conduction in the film or the ceramic support member show an undesirable increase.

A known method of improving the foregoing defect, as disclosed in, e.g., Japanese Patent Public Disclosure No. 134919/1988, involves an amelioration in the characteristics of response to variations in air flow rate by adding a contrivance described in the publication to the structure of the thermal air flow-rate sensor.

There arise, however, problems inherent in the thus constructed thermal air flow-rate sensor, wherein the structure becomes intricate, on account of the fact that the response is improved by the sensor itself, to thereby cause a difficulty in manufacturing the sensor which in turn causes a rise in price.

SUMMARY OF THE INVENTION

It is a primary object of the present invention, which has been devised to obviate the above-mentioned problems, to provide a signal processing method and apparatus capable of improving a response by processing a signal, which involves the use of an inexpensive thermal flow-rate sensor with a simple structure.

To this end, according to one aspect of the invention, there is provided a method of processing a signal of a thermal flow-rate sensor, including a temperature-dependent resistor whose value fluctuates depending on a temperature and a support member for holding this temperature-dependent resistor, for detecting a flow rate of a fluid on the basis of an output signal formed via the temperature-dependent resistor, comprising the steps of: providing a temperature monitor for monitoring a temperature at a representative point of the support member; obtaining a value of the temperature at the representative point of the support member by use of the temperature monitor; and correcting an output of the flow-rate sensor in accordance with a value corresponding to the temperature at the representative point of the support member and a flow rate as well as the value corresponding to the temperature at the representative point when the flow rate of the fluid is equilibrated to maintain a steady state.

In accordance with one embodiment of the signal processing method according to the present invention, it is possible to eliminate an error of measurement which is caused by a lag in thermal response of the flow-rate sensor in a transient state.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENT

Figure 1:
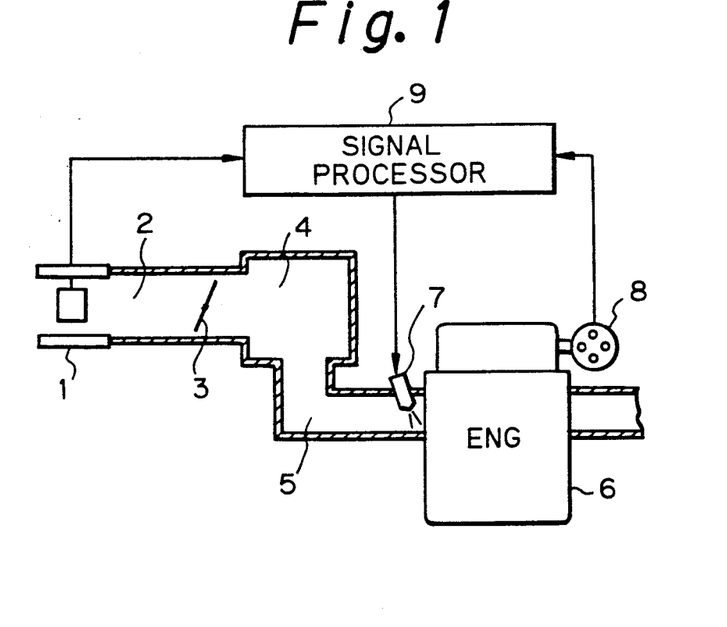
FIG. 1 is a block diagram illustrating a fuel injection device of an internal combustion engine in one embodiment of the present invention.
Figure 2:
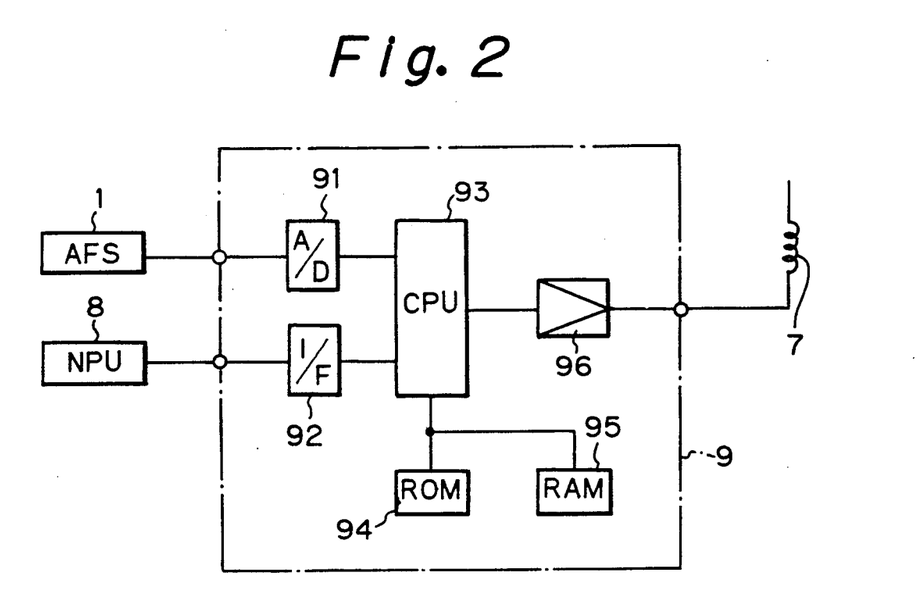
FIG. 2 is a block diagram depicting a signal processor of the fuel injection device shown in FIG. 1.
Figure 3A:
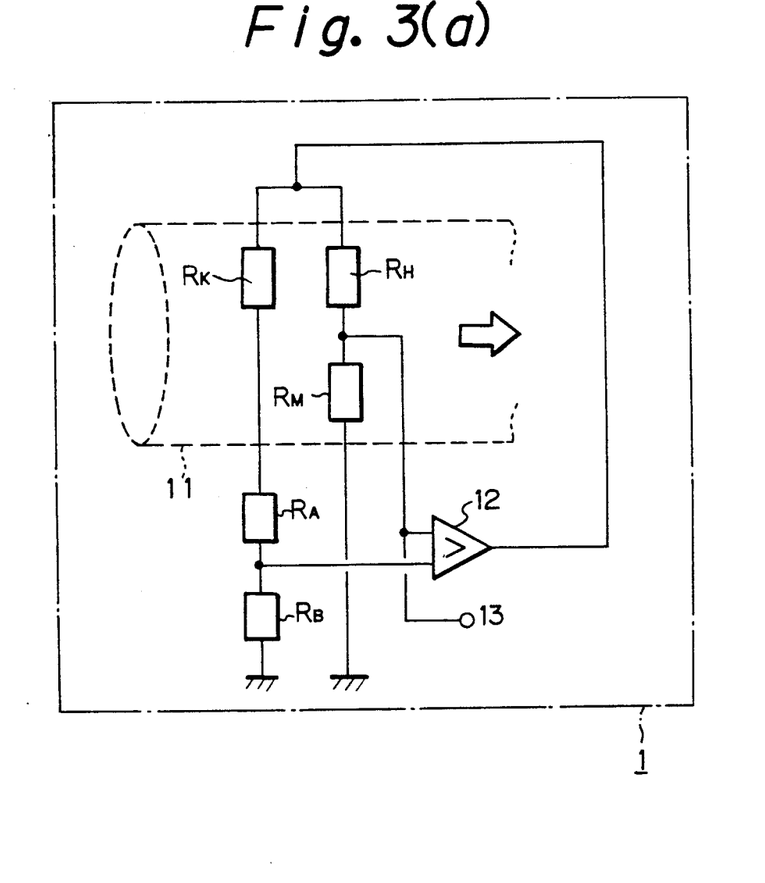
FIGS. 3(a) and 3(b) are block diagrams illustrating a thermal air flow-rate sensor of the internal combustion engine.
Figure 3B:
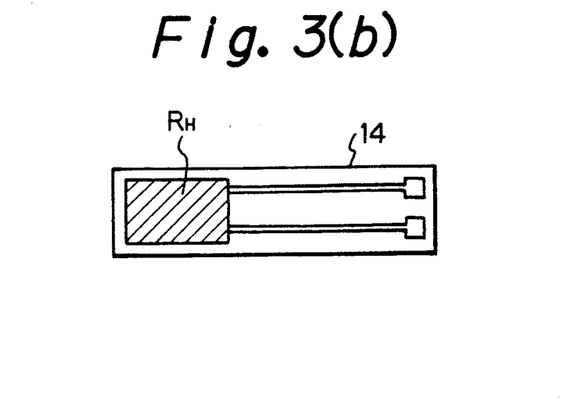

Mention will first be made of a fuel injection device which employs a thermal air flow-rate sensor according to the present invention. Referring first to FIG. 1, reference numeral 1 designats a thermal air flow-rate sensor; 2 is an intake passageway for accommodating the air flow-rate sensor 1; 3 is a throttle valve for adjusting an intake air flow rate; 4 is a surge tank; 5 is an intake manifold; 6 is an engine; 7 is an injector attached to the intake manifold for every cylinder; and 8 is a crank angle sensor, incorporated into a distributor secured to a cam shaft of the engine 6, for detecting a rotary position of a crankshaft. Designated at 9 is a signal processor for controlling an injection pulse width of the injector 7 by arithmetically correcting an air flow-rate signal transmitted from the air flow-rate sensor 1 in accordance with an engine revolution number signal transmitted from the crank angle sensor 8 with the air of a variety of unillustrated sensors. The signal processor 9 is, as illustrated in FIG. 2, composed of: an A/D converter 91 for digitally converting an output voltage signal of the thermal air flow-rate sensor 1; a digital interface 92 for shaping a waveform of an output signal of the crank angle sensor 8; a central processing unit (CPU) 93 for performing an arithmetic operation upon receiving outputs of these components; a ROM 94 for permanently storing data; a RAM 95 for temporarily storing data; and a driving circuit 96 for generating an output signal. A fundamental arithmetic method involves the steps of, as will be mentioned later, arithmetically correcting an air flow rate by use of an A/D value of the air flow-rate sensor and a revolution number signal transmitted from the crank angle sensor, calculating a fuel injection pulse width from the revolution number signal and the arithmetic value by a known method and controlling the injector 7 by the driving circuit 96. Turning to FIG. 3(a), there is depicted the thermal air flow-rate sensor 1 employed for the above-mentioned fuel injection device. Indicated at 11 is a tubular housing serving as a passageway through which the air flows in the direction shown. The symbol $R_H$ denotes a temperature-dependent resistor for detecting an air flow rate, the resistor $R_H$ being constructed by depositing, as illustrated in FIG. 3(b), platinum in some shape such as a myanda configuration on an aluminum substrate 14 and disposing it in the interior of the air passageway together with other resistors $R_K$ and $R_M$. The resistors $R_H$, $R_M$, $R_K$, $R_A$ and $R_B$ are combined to constitute a resistance value detecting unit in the form of known bridge circuitry and cooperate with a differential amplifier 12 to further shape a closed loop. A control process is so effected that a temperature or a resistance value of the resistor $R_H$ is kept constant. For this reason, an electric current provided to the resistor $R_H$ is determined corresponding to the air flow rate. An output voltage at terminal 13 can be obtained from a product of a value of this current and a resistance value of the resistor $R_H$.

Figure 4:
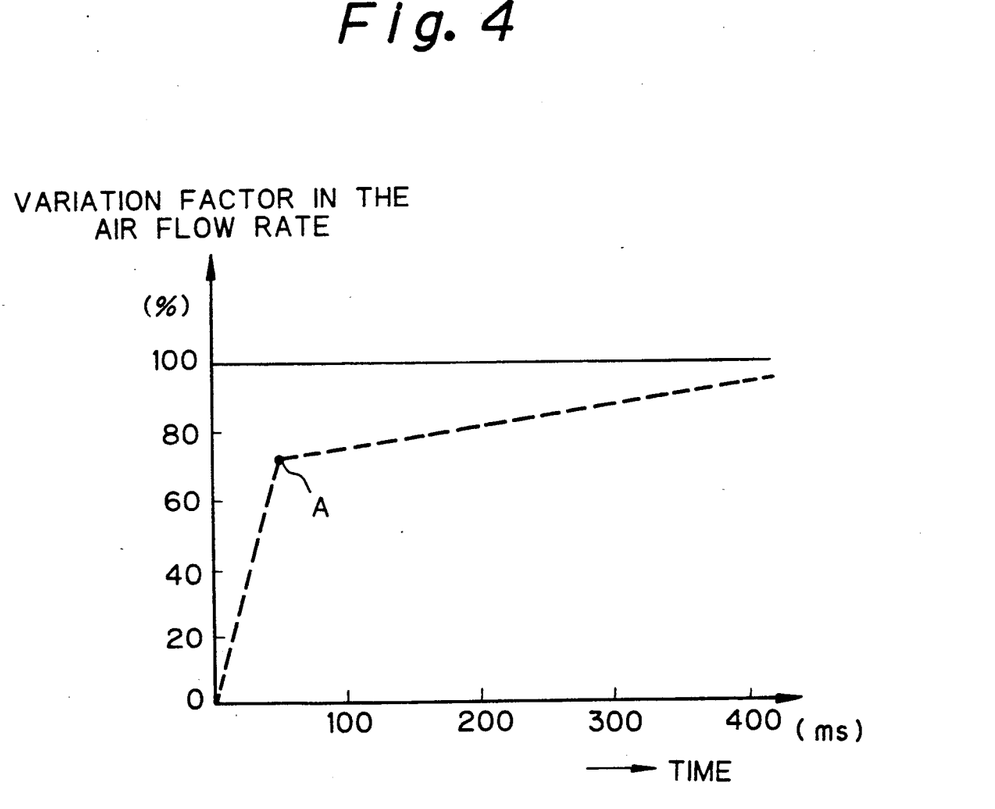
FIG. 4 is a chart showing a variation factor in air flow rate of the sensor when changing the air flow rate stepwise.
Figure 5:
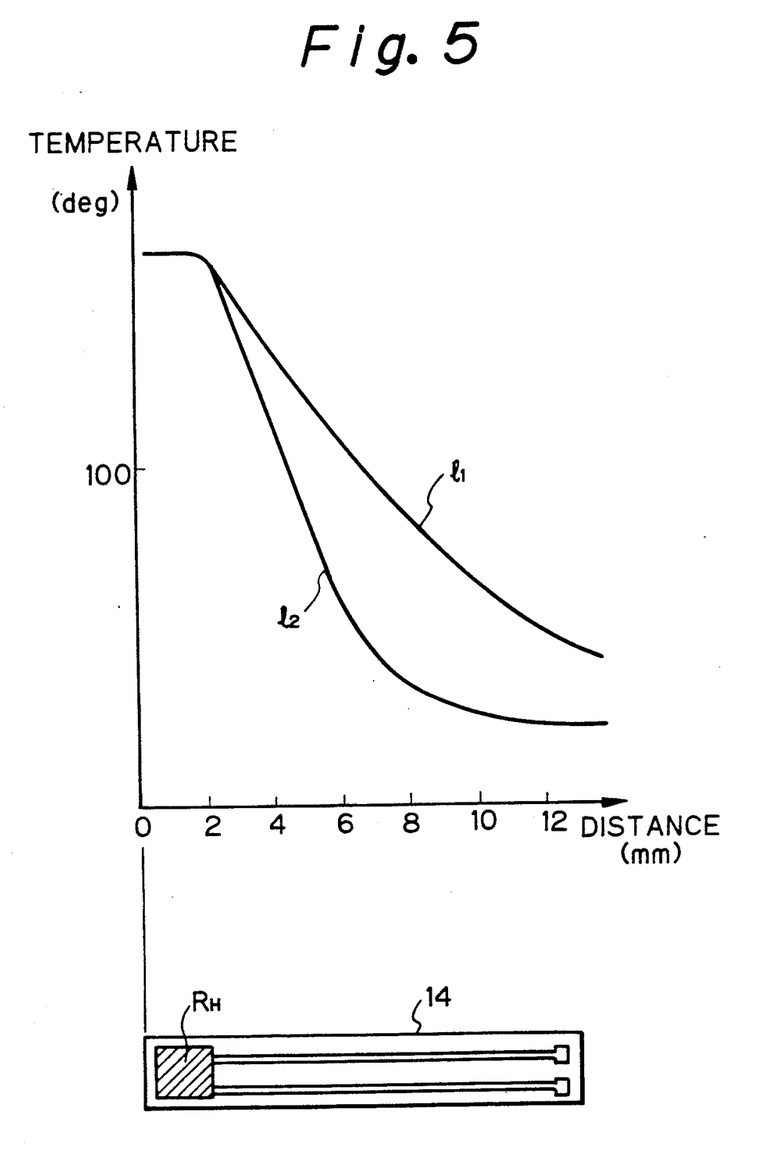
FIG. 5 is a chart explaining a lag in the thermal response of the sensor.

A description will next be made of a response lag when the air flow rate in the thermal air flow-rate sensor 1 varies. FIG. 4 is a chart showing a response of the thermal air flow-rate sensor when changing the air flow rate stepwise, wherein there is exhibited a characteristic response substantially assuming a broken line with a point A defined as a node. The abscissa axis indicates a time period elapsing after the stepwise variations have been made, while the ordinate axis indicates a variation factor in the air flow rate. A time lag up to the point A is chiefly caused by a lag in thermal response by the platinum resistor $R_H$ as well as by a retarded circuit response. A deviation from a target value at the point A and a time until a convergence from the point A to the target value is attained are caused mainly by heat accumulation and thermal conduction in the aluminum substrate 14 serving as a support member for the platinum resistor $R_H$. FIG. 5 is a chart explaining the operation discussed above. There is shown a temperature distribution on the aluminum substrate 14, wherein the abscissa axis indicates a distance from a platinum resistor $R_H$ position taken as a reference. A temperature in the vicinity of the platinum resistor $R_H$ is controlled to be at a constant value above that of the air temperature by use of the above-mentioned circuit. Thermal conduction occures from the platinum resistor $R_H$ to the aluminum substrate 14 having a thermal conductivity sufficiently greater than that of air and the heat accumulation in the substrate 14. The circuit concerned functions to control the current fed to the platinum resistor $R_H$ by compensating for thermal loss. Hence, it follows that the output of the thermal air flow-rate sensor 1 with respect to a predetermined air flow rate has a value equivalent to the accumulated heat transferred to the aluminum substrate 14. Accurate flow-rate characteristics are to be obtained in such a state that the heat equilibrates on the aluminum substrate 14, i.e, attains a steady state. If the air flow rate varies, however, the heat does not equilibrate, with the result that an error in the flow-rate characteristics is created. Referring to FIG. 5, the symbol $l_1$ indicates a temperature distribution when the air flow rate is low, whereas $l_2$ represents a temperature distribution when the air flow rate is high. $l_2$ plots lower than $l_1$ because the cooling effects of the aluminum substrate 14 differ depending on a flow rate of the flowing air. When changing the air flow rate stepwise from $l_1$ to $l_2$, the temperature distribution curve eventually reaches $l_2$. Initially, however, an air flow rate corresponding to $l_2$ is exhibited, but the temperature distribution curve still approximates that indicated by $l_1$. Therefore, it follows that electric power supplied to the platinum resistor $R_H$, i.e., an output of the thermal air flow-rate sensor 1, becomes smaller than originally expected. More specifically, if the air flow rate varies, there is created an initial flow-rate error corresponding to a difference between a temperature distribution corresponding to the air flow rate before the variations thereof and a temperature distribution corresponding to the air flow rate after the variations thereof. Therefore, it follows that an error in the time taken for the temperature distribution to reach a steady state with respect to the air flow rate after being varied continues while being gradually reduced. In the thermal air flow-rate sensor 1 depicted in FIG. 3, there are large influences associated with the heat accumulation and the heat transfer in the aluminum substrate 14 serving as a support member. Even in a sensor manufactured so that an area of the platinum resistor $R_H$ and a thickness of the aluminum substrate 14 are considered to exhibit sufficient response and durability to be utilizable in a fuel injection device of an internal combustion engine, an initial flow-rate deviation is 30% at the maximum, while a continuous deviation time is approximately 500 ms. This response lag is not allowable in the above-described fuel injection device, and hence the response has to be improved according to the present invention.

A description will next be given of a signal processing method by way of one embodiment of the present invention.

Figure 6A:
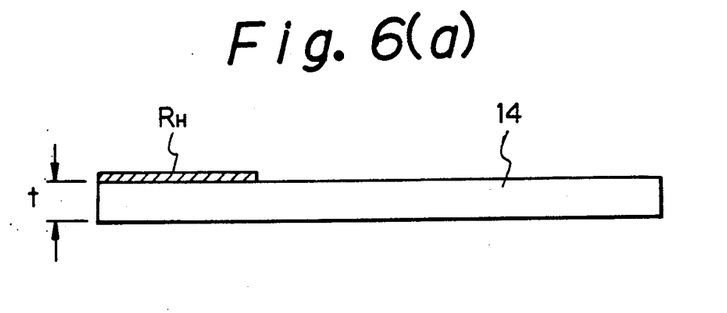
FIGS. 6(a), 6(b) and 6(c) are diagrams explaining a method of processing a signal according to the present invention.
Figure 6B:
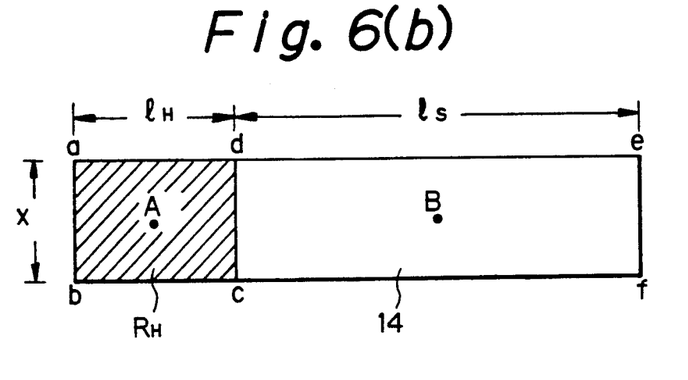
Figure 6C:
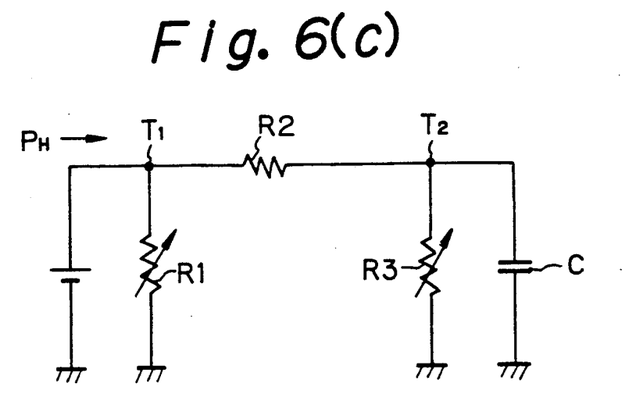

Turning to FIG. 6, there is illustrated a thermal air flow-rate sensor constructed in such a way that platinum $R_H$ is deposited on the aluminum substrate 14 shown in FIG. 3(b). Referring to FIGS. 6(a) and (b), the symbol t denotes a thickness of the aluminum substrate 14, x represents a width of the aluminum substrate, lH stands for a length of a heater member $R_H$ and lS designates a length of a substrate support member. The heater member $R_H$ corresponding to a portion indicated by abcd is formed by depositing platinum on one surface of the aluminum substrate 14. Note that the thickness of the platinum is considerably smaller than that of the aluminum substrate 14 and can therefore be ignored. On the other hand, the support member corresponds to a portion depicted by cdef. Central points A and B of the heater member and of the support member are respectively set as representative points. Referring to FIG. 6(c), there is illustrated a thermal air flow-rate sensor in the form of a thermal circuit. The representative point A of the heater member is expressed as a battery in FIG. 6(c) as the point A is controlled at a constant temperature $T_1$. A resistance R1 of the heater member is represented as a thermal resistance representing a heat transfer from the heater member to the air, and a resistance value thereof varies depending on the air flow rate. Further, a thermal resistance R2 indicates a heat transfer from the heater member to the support member; and a thermal resistance R3 exhibits a heat transfer from the support member to the surrounding air, a resistance value of which, as in the thermal resistance R1, changes depending on the air flow rate. Further, a capacitance C is defined as a thermal capacitance of the support member, wherein $T_2$ represents a temperature at the point B of the support member. In the thus constructed thermal circuit, various elements of the respective components are expressed as follows.

$$R1 = \frac{1}{hm \cdot xlH} \cdot \frac{1}{2} \quad \left[\frac{h \cdot °C.}{kcal}\right] \tag{1}$$

$$R2 = \frac{(lH + lS)/2}{\lambda_c \cdot xt} \quad \left[\frac{h \cdot °C.}{kcal}\right] \tag{2}$$

$$R3 = \frac{1}{hm \cdot xlS} \cdot \frac{1}{2} \quad \left[\frac{h \cdot °C.}{kcal}\right] \tag{3}$$

$$hm = \frac{\lambda_a}{x} \cdot Nu \quad \left[\frac{kcal}{m^2 \cdot h \cdot °C.}\right] \tag{4}$$

$$C = Cp \cdot xlSt \cdot \gamma \quad \left[\frac{kcal}{°C.}\right] \tag{5}$$

where
$\lambda_c$: the aluminum substrate heat conductivity [kcal/m·h·°C.],
$\lambda_a$: the air thermal conductivity [kcal/m·h·°C.],
Cp: the aluminum substrate specific heat [kcal/kg·°C.],
Y: the aluminum substrate specific gravity [kg/m³],
Nu: the Nusselt number,
Pr: the Prandtl number,
Re: the Reynolds number,
U: the air flow speed [m/h],
$v$: the air kinematic viscosity coefficient [m²/h],
Q: the air flow rate [kg/h],
S: the air flow rate sensor passageway sectional area [m²], and
$\rho_a$: the air density [kg/m³].

It is to be noted that a pohlhausen solution is known in regard to a plate laminar interface, and the Nusselt number, Nu, is expressed by the following formula:

$$Nu = 0.664 \cdot Pr^{\frac{1}{3}} \cdot \sqrt{Re} \tag{6}$$

where Pr is the Prandtl number of air, i.e., approximately 0.71 at a normal temperature, and Re is the Reynolds number expressed by the following formula which employs the flow speed U, the kinematic viscosity coefficient $v$ of air, and the representative dimension x of the thermal flow-rate sensor. Besides, this is convertible into the mass flow rate Q determined by the sensor output in combination with the passageway sectional area S of the thermal flow-rate sensor and the air density $\rho_a$.

$$Re = \frac{U \cdot x}{v} = \frac{Q}{S \cdot \rho_a} \cdot \frac{x}{v} \tag{7}$$

From the formulae (1), (4), (6) and (7), the thermal resistances R1 and R3 are given by:

$$R1 = \frac{K_1}{\sqrt{Q}} \tag{8}$$

where, $$K_1 = \frac{1}{0.664 \cdot Pr^{\frac{1}{3}} \cdot 2lH \cdot \lambda_a} \cdot \sqrt{\frac{S\rho_a v}{x}} \tag{9}$$

Similarly, $$R3 = \frac{K_3}{\sqrt{Q}} \tag{10}$$

where, $$K_3 = \frac{1}{0.664 \cdot Pr^{\frac{1}{3}} \cdot 2lS \cdot \lambda_a} \cdot \sqrt{\frac{S\rho_a v}{x}} \tag{11}$$

Next, in the thermal circuit depicted in FIG. 6(c), a heat flow from the point A to the point B is given such as:

$$\frac{T_1 - T_2}{R2} = C \cdot \frac{dT_2}{dt} + \frac{T_2}{R3} \tag{12}$$

Further, the whole heat flow $P_H$ is given by:

$$P_H = \frac{T_1}{R1} + \frac{T_1 - T_2}{R2} \tag{13}$$

Subsequently, a differential equation substitutes for the formula (12) for enabling arithmetic calculations by a microprocessor. Namely, if sampling is effected per $\Delta T$, the formula (12) is replaced such as:

$$\frac{T_1 - T_2(i)}{R2} = C \cdot \frac{T_2(i) - T_2(i-1)}{\Delta T} + \frac{T_2(i)}{R3} \tag{14}$$

Rearranging the formula (14), $$T_2(i) = \frac{\frac{C}{\Delta T}}{\frac{C}{\Delta T} + \frac{1}{R2} + \frac{1}{R3}} \left\{ T_2(i-1) + \frac{\Delta T}{C} \cdot \frac{T_1}{R2} \right\} \tag{15}$$

Substituting the formula (10), $$T_2(i) = \frac{\frac{C}{\Delta T}}{\frac{C}{\Delta T} + \frac{1}{R2} + \frac{\sqrt{Q}}{K_3}} \left\{ T_2(i-1) + \frac{\Delta T}{C} \cdot \frac{T_1}{R2} \right\} \tag{16}$$

This formula (16) is associated with a temperature monitor at the representative point B of the aluminum substrate, wherein the variables are the air flow rate Q and the constants which are determined by the configuration, dimensions and quality of the support member. Now, the temperature $T_{2S}$ when the temperature equilibrates with respect to the air flow rate Q is to be obtained.

In this case, $T_2(i) = T_2(i-1) = T_{2S}$. Hence, $$T_{2S} = \frac{T_1}{1 + \frac{R2}{K_3}\sqrt{Q}} \quad (17)$$

Secondly, let $P_{HS}$ be a heat flow when the temperature is brought into equilibrium with respect to the air flow rate Q in the formula (13), and the heat flow is given by:

$$P_{HS} = \frac{T_1}{R1} + \frac{T_1 - T_{2S}}{R2} \quad (18)$$

Substituting the formulae (8) and (17), $$P_{HS} = \frac{T_1}{K_1}\sqrt{Q} + \frac{T_1}{R2}\left(1 - \frac{1}{1 + \frac{R2}{K_3}\sqrt{Q}}\right) \quad (19)$$

A difference $\Delta P_H$ between $P_H$ in the present state and $P_H$ in the equilibrium is given by:

$$\Delta P_H = P_H - P_{HS} \quad (20)$$

and, $$\Delta P_H \approx \frac{dP_{HS}}{dQ} \cdot \Delta Q \quad (21)$$

where $\Delta Q$ is the difference between the mass flow rate Q corresponding to the output of the working thermal air flow-rate sensor and a true value (a mass flow rate corresponding to the output of the same sensor when in a thermally equilibratory state). From the formulae (13), (19), (20) and (21), the difference is expressed such as:

$$\Delta Q \approx \frac{\Delta P_H}{dP_{HS}/dQ} = \frac{P_H - P_{HS}}{(d/dQ)\{P_{HS}\}} \quad (22)$$

$$= \frac{(1/R2)(T_{2S} - T_2)}{\frac{d}{dQ}\left\{\frac{T_1}{K_1}\sqrt{Q} + \frac{T_1}{R2}\left(1 - \frac{1}{1 + (R2/K_3)\sqrt{Q}}\right)\right\}}$$

$$= \frac{(1/R2)\{T_{2S} - T_2(i)\}}{\frac{T_1}{2\sqrt{Q}}\left(\frac{1}{K_1} + \frac{1}{K_3} \cdot \frac{1}{[l + (R2/K_3)\sqrt{Q}]^2}\right)}$$

Let Q* be a flow rate after a correction has been made, and this flow rate is given by:

$$Q^* = Q + \Delta Q \quad (23)$$

Combining the formulae (16), (17) and (22), $$T_2(i) = F(Q)\{T_2(i-1) + K\} \quad (24)$$

$$T_{2S} = G(Q) \quad (25)$$

$$\Delta Q = H(Q)\{T_{2S} - T_2(i)\} \quad (26)$$

where, $$F(Q) = \frac{\frac{C}{\Delta T}}{\frac{C}{\Delta T} + \frac{1}{R2} + \frac{\sqrt{Q}}{K_3}} \quad (27)$$

$$K = \frac{\Delta T}{C} \cdot \frac{T_1}{R2} \quad (28)$$

$$G(Q) = \frac{T_1}{1 + \frac{R2}{K_3}\sqrt{Q}} \quad (29)$$

$$H(Q) = \frac{1}{\frac{T_1}{2R2\sqrt{Q}}\left(\frac{1}{K_1} + \frac{1}{K_3} \cdot \frac{1}{[1 + (R2/R3)\sqrt{Q}]^2}\right)} \quad (30)$$

In this manner, F(Q), G(Q) and H(Q) are preset in a table wherein a factor is the flow rate Q, and the arithmetic operation of the formula (24) is performed for every predetermined time ($\Delta T$), thereby obtaining a value for the temperature $T_2(i)$. Thereafter, the arithmetic operations of the formulae (25) and (26) are effected by an interrupting process according to the number of revolutions of the internal combustion engine, thereby obtaining $\Delta Q$. Then, the flow rate is arithmetically corrected by the formula (23).

Figures 7, 8:
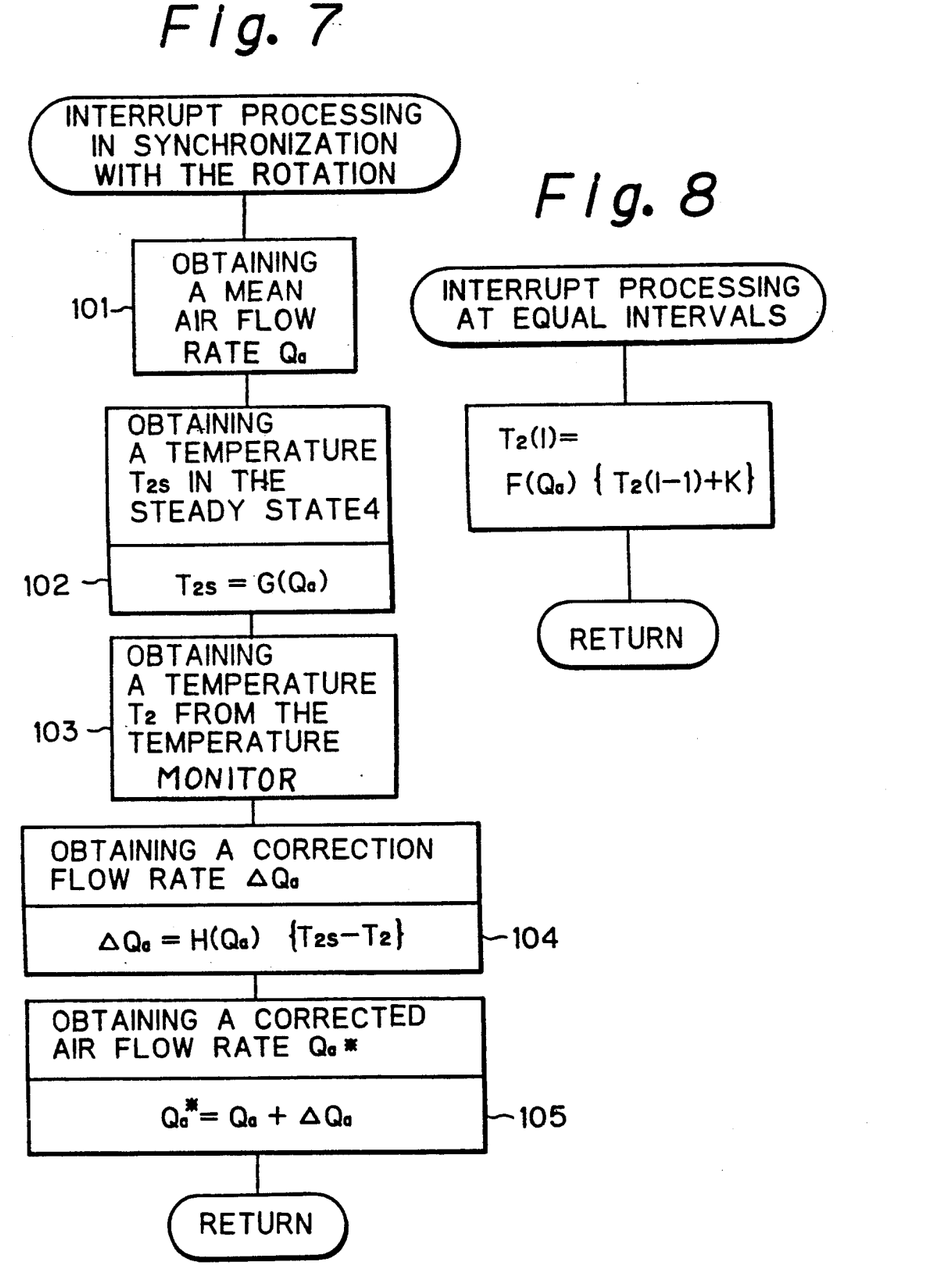
FIGS. 7 and 8 are flowcharts each showing the signal processing method of the invention.

Next, the arithmetic operations of the air flow rate observe will be explained with reference to a flowchart of FIG. 7.

To begin with, the signal processor 9 obtains a corresponding flow rate on the basis of flow rate characteristics measured beforehand from a value into which an output voltage of the air flow-rate sensor 1 is A/D converted at a predetermined interval. When inputting an interruption signal (per 30 msec at 1000 rpm in the case of a 4-cylinder engine) of the crank angle sensor, in a step 101 there is obtained a mean air flow rate Qa between the rotational signals from an integration value of the flow rates at these timings as well as from an integration number. Next, in a step 102 there is obtained a temperature $T_{2S}[=G(Qa)]$ at the representative point of the holding point when the air flow-rate sensor 1 is in the steady state, i.e., in a state of thermal equilibrium. The value of G(Qa) is obtained on the basis of the relationship of Q=Qa by table processing wherein Q is a factor and by using the foregoing formula (29). Subsequently in a step 103, a temperature $T_2$ at the representative point of the present support member is obtained by a constant interrupting process which will be mentioned later.

In a step 104, a correction flow rate $\Delta Qa$ is obtained similarly on the basis of the relationship of Q=Qa by using the formulae (26) and (30). Finally in a step 105, there will be obtained a virtual air flow rate Qa* corrected by adding the correction flow rate $\Delta Qa$ to the mean air flow rate Qa.

Note that the constant time interrupting process for obtaining the temperature at the representative point of the support member is effected at every $\Delta T$. A substitution arithmetic operation is carried out, wherein Qa at every $\Delta T$ is expressed such as Q=Qa. As a result, the temperature monitor outputs a value T(i) expressed by a recursion formula at every $\Delta T$. The reason why the flow rate is arithmetically corrected not by processing at equal intervals but by processing in synchronization with the rotations is that the fuel injection device is capable of controlling an air/fuel ratio with a high degree of accuracy and response by carrying out an injecting process corresponding to a flow rate of air sucked in each cylinder in synchronization with the rotations.

As discussed above, in accordance with the present invention, there is provided a temperature monitor at a representative point on the substrate for supporting the temperature-dependent resistor of the output of air flow-rate sensor 1. The output of the flow-rate sensor is corrected in accordance with the two values, the value corresponding to the temperature at the representative point of the support member which is obtained by using the temperature monitor and the value corresponding to the temperature at the representative point when the above-mentioned output assumes an equilibrium in which a steady state is maintained. With this arrangement, it is possible to obviate the thermal influences caused by the support member for the temperature-dependent resistor and to improve response when detecting an air flow rate.

The embodiment given above has dealt with the air flow-rate sensor 1 defined as a thermal flow-rate sensor, of an internal combustion engine. The present invention can be applied to a thermal flow-rate sensor wherein the temperature or the temperature distribution of the support member and the temperature-dependent resistor deviates from the equilibratory value of the flow rate with respect to the variations in the flow rate of a fluid thereby causing errors in flow-rate characteristics. The applicability of the present invention extends to, e.g., an EGR gas flow rate sensor of the internal combustion engine.

Besides, the signal processing method is arranged to correct a value of flow rate of the thermal air flow-rate sensor in accordance with the embodiment of the invention. There may, however, be employed an output value of the flow-rate sensor or a value which is converted into A/D from this output value.

As discussed above, according to the present invention, a lag in the thermal response of the holding member and the temperature-dependent resistor in the thermal flow-rate sensor can be corrected by processing the signal. Hence, it is feasible to measure a flow rate with a good response by use of an inexpensive thermal flow-rate sensor having a simple structure.

Although the illustrative embodiment of the present invention has been described in detail with reference to the accompanying drawings, it is to be understood that the present invention is not limited to that precise embodiment. Various changes or modifications may be effected therein by one skilled in the art without departing from the scope or spirit of the invention.

What is claimed is:

1. A method of processing a signal of a thermal flow-rate sensor, including a temperature-dependent resistor having a resistance value which fluctuates depending on temperature, and a substrate support member for supporting said temperature-dependent resistor, said thermal flow-rate sensor detecting a flow rate of a fluid on the basis of an output signal formed via said temperature-dependent resistor, comprising the steps of:

providing a temperature monitor for monitoring a temperature at a representative point of said support member;

obtaining a temperature at the representative point corresponding to the flow rate of said fluid by use of said temperature monitor; and correcting an output of said flow-rate sensor in accordance with a value corresponding to the temperature obtained by use of said temperature monitor and a value corresponding to the temperature at the representative point when the flow rate is in a steady state.

2. A method according to claim 1, further comprising the step of calculating a temperature at the representative point of the support member when the flow-rate is in the steady state.

3. A method according to claim 1, wherein said thermal flow-rate sensor is used for detecting an air intake flow rate of an internal combustion engine and the output of said flow-rate sensor is corrected in synchronization with the rotation of the internal combustion engine.

4. An apparatus for correcting an output of a thermal flow-rate sensor for detecting a flow rate of a fluid on the basis of an output signal formed via a temperature-dependent resistor, comprising:

a substrate support member for supporting said temperature-dependent resistor;

a temperature monitor for monitoring a temperature at a representative point of said support member at equal intervals and outputting the temperature; and a correcting means for correcting an output of said flow-rate sensor in accordance with a value corresponding to the temperature obtained by use of said temperature monitor and a value corresponding to the temperature at the representative point when the flow rate is in a steady state.

5. An apparatus according to claim 4, further comprising means for obtaining a temperature at a representative point of the support member when the flow-rate is in a steady state.

6. An apparatus according to claim 4, wherein said thermal flow-rate sensor is used for detecting an air intake flow rate of an internal combustion engine and said correcting means corrects the output of said flow-rate sensor in synchronization with the rotation of the internal combustion engine.

* * * * *